United States Patent
Cargo et al.

(10) Patent No.: US 8,366,063 B2
(45) Date of Patent: Feb. 5, 2013

(54) DIRECTIONALLY ADJUSTABLE MOUNT WITH LOCKING PARTS AND METHODS

(75) Inventors: Ryan Christopher Cargo, Lanham, MD (US); Wayne Dennis Eklund, Bel Air, MD (US)

(73) Assignee: Sigma Space Corporation, Lanham, MD (US)

( * ) Notice: Subject to any disclaimer, the term of this patent is extended or adjusted under 35 U.S.C. 154(b) by 281 days.

(21) Appl. No.: 12/852,618

(22) Filed: Aug. 9, 2010

(65) Prior Publication Data

US 2012/0032055 A1  Feb. 9, 2012

(51) Int. Cl.
*F16M 11/02* (2006.01)

(52) U.S. Cl. ............... 248/179.1; 248/397; 359/822; 359/871

(58) Field of Classification Search ......... 248/397, 248/179.1, 178.1, 180.1, 185.1, 176.3, 346.05; 359/433, 811, 819, 822, 871
See application file for complete search history.

(56) References Cited

U.S. PATENT DOCUMENTS

| | | | |
|---|---|---|---|
| 3,700,313 A | | 10/1972 | Karr et al. |
| 3,752,429 A | * | 8/1973 | Reed ........................ 248/179.1 |
| 4,278,031 A | * | 7/1981 | Dangschat ........................ 108/4 |
| 5,140,470 A | * | 8/1992 | Luecke ........................ 359/818 |
| 5,798,879 A | * | 8/1998 | Salvio ........................ 359/857 |
| 6,016,230 A | | 1/2000 | Nunnally et al. |
| 6,198,580 B1 | * | 3/2001 | Dallakian ........................ 359/822 |
| 6,304,393 B1 | * | 10/2001 | Sechrist et al. ............... 359/822 |
| 6,411,447 B1 | * | 6/2002 | Hilbert ........................ 359/822 |
| 6,590,723 B1 | * | 7/2003 | Hodge ........................ 359/822 |
| 6,614,601 B2 | * | 9/2003 | Dallakian ........................ 359/804 |
| 7,090,177 B2 | * | 8/2006 | Milton et al. ............. 248/180.1 |
| 7,760,449 B2 | * | 7/2010 | Theriault et al. ............. 359/819 |
| 7,982,980 B2 | * | 7/2011 | Rigney ........................ 359/822 |
| 8,100,377 B1 | * | 1/2012 | Blackburn ................ 248/475.1 |
| 2007/0171553 A1 | | 7/2007 | Rigney |

* cited by examiner

*Primary Examiner* — Bradley Duckworth

(74) *Attorney, Agent, or Firm* — Miodrag Cekic; Intellectual Property Strategists, LLC

(57) ABSTRACT

A method of locking of and a directionally adjustable mount including a first plate arranged to stabilize an anisotropic device, a second plate arranged to engage the first plate and provide a support, a second supporting member arranged to engage the second plate and to rollably support the first plate so as to define a local spacing between the plates, and a first supporting member arranged to have a first axis of symmetry and to contact the first plate and engage the second supporting member. In a locked position, the supporting members are arranged coaxially regarding the axis of symmetry, such that a sum of a positioning force applied by the first supporting member and a locking force applied by the second supporting member upon the first plate substantially vanishes, so that a resulting local moment of force oriented to deform the at least one first plate also substantially vanishes.

21 Claims, 5 Drawing Sheets

DIRECTIONALLY ADJUSTABLE MOUNT WITH LOCKING PARTS AND METHODS

FIELD OF THE INVENTION

This invention relates generally to mounting assemblies for supporting a variety of functionally anisotropic parts to securely face a predetermined space angle. More particularly, the present invention pertains to adjustable lockable mounting assemblies.

BACKGROUND OF THE INVENTION

Many devices depend on accurately known orientation for proper function or proper executions of desired measurement procedures. Frequently, those anisotropic devices internalize an intrinsic system of preferable directions which may define an internal coordinate system. The usage of the anisotropic devices may critically depend on accurate preferred orientation of the internal coordinate system relative to some external components of interest and stable support of the anisotropic devices in the preferred orientation. Also, long term stability and reproducibility of desired orientations are frequently necessary for particular applications. It is in accordance with engineering and scientific practice to provide such anisotropic devices with supporting mounting structures which can define the preferred orientations and stably support the anisotropic devices in the desired orientations such that the desired orientations do not drift in time or can be changed and/or reestablished with relative ease and accuracy.

The anisotropic devices and parts in accordance with the present invention include, but are not limited to, optical components like mirrors and mirror assemblies, diffuse reflectors, lances and lens assemblies, polarizers, beam splitters, filters (including interference filters), prisms, diffraction gratings, echelons, phase plates, frequency converters, light amplifiers, lasers (including fiber optic lasers and laser diodes), light and microwave sources, light emitting diodes (including organic light emitting diodes), Q-switches, Bragg and Pockels cells, light detectors (including photocells, photocathodes, photodiodes, avalanche photodiodes, photomultipliers, microchannel plates, image amplifiers, charge coupling detectors, scintillation detectors, Cherenkov detectors, etc.), and objectives (including wide angle, telephoto, zoom, Barlow lenses, etc.)

Similarly, various acoustic devices such as directional sound detectors (microphones), sound sources (speakers and acoustic oscillators), as well as parts of noise detector systems and sonar systems, exhibit inherent anisotropies and need to be oriented and supported to face preferred space angles in order to perform desirable emitting or receiving functions.

Also, it should be noted that anisotropic devices and parts in the fields of electronics, particle and wave beams generation and applications, or surfaces modifications, frequently need to be oriented and stabilized to face predetermined space angles, and therefore, may utilize directionally adjustable mounts and methods in accordance to the present invention.

It is customary in the art of adjustable mounting assemblies to design the mounting assembly comprised of two principle subassemblies. One supporting subassembly may be customarily arranged to provide solid attachment to underlying structures (for example, optical tables or optical benches), while another actuating subassembly may be arranged to adjustably engage the supporting subassembly and to orient and stabilize at least one anisotropic device such that the at least one anisotropic device is oriented to face a desired space angle. It is broadly accepted in the field of adjustable mounting devices to indicate those subassemblies as plates, although it may not be necessary for the plate to have a general form incorporating substantially planar parallel surfaces.

For the purpose of the current inventions the above subassemblies are indicated as a second plate and a first plate respectfully. The first plate and the second plate of the current invention each include at least two distinct surfaces which may not necessarily be planar (i.e. may be three-dimensional, but at least one surface of each plate may have a geometry allowing for definitions of at least one 3D distinct coordinate system for each plate having axes whose specification in a laboratory coordinate system uniquely defines an orientation of the supported anisotropic device allowing it to face a predetermined space angle.)

SUMMARY OF THE INVENTION

Some embodiments of present invention include a directionally adjustable mount including: at least one first plate being arranged to orient and stabilize at least one anisotropic device such that the at least one anisotropic device is oriented to face a desired space angle, at least one second plate being arranged to engage the at least one first plate and provide a support for the at least one first plate, at least one second supporting member arranged to engage the at least one second plate and to rollably support the at least one first plate so as to define a local spacing between the at least one first plate and the at least one second plate, and at least, one first supporting member which has been arranged to have a first axis of symmetry and to contact the at least one first plate and engage the at least one second supporting member. The at least one second supporting member and the at least one first supporting member have been arranged coaxially regarding the first axis of symmetry and the second axis of symmetry, such that, when in a locked position, a sum of a positioning force applied by the at least one first supporting member and a locking force applied by the at least one second supporting member upon the at least one first plate substantially vanishes, so that a resulting local moment of force oriented to deform the at least one first plate also substantially vanishes.

Methods for locking a directionally adjustable mount in accordance to some embodiments of the present invention includes steps of: providing at least one first being arranged to orient and stabilize at least one anisotropic device such that the at least one anisotropic device is oriented to face a desired space angle, providing at least one second plate being arranged to engage the at least one first plate and provides support for the at least one first plate, providing at least one second supporting member arranged to engage the at least one second plate and rollably support the at last one first plate so as to define a local spacing between the at least one first plate and the at least one second plate, providing at least one first supporting member arranged to apply a locking force to the at least one first plate, and to engage the at least one second supporting member, positioning the at least one second supporting member and the at least one first supporting member coaxially regarding the first axis and the second axis and engaging the at least one first supporting member with the at least one second supporting member such that the at least one second supporting member actuates the at least one first plate by application of the positioning force controlled to orient the at least one first plate such that the at least one anisotropic device is moved to face the desired space angle, positioning the at least one first supporting member relative to the at least one second supporting member to achieve a locking position such that a sum of the positioning force acting by the at least one second supporting member and the locking force acting by the at least one first supporting member upon the at least one first plate substantially vanishes, so that a resulting local moment of force oriented to deform the at least one first plate also substantially vanishes.

Different methods for locking a directionally adjustable mount in accordance to other embodiments of the present invention includes steps of: providing at least one first being arranged to orient and stabilize at least one anisotropic device such that the at least one anisotropic device is oriented to face a desired space angle, providing at least one second plate being arranged to engage the at least one first plate and provides support for the at least one first plate, providing at least one second supporting member arranged to engage the at least one second plate and rollably support the at least one first plate so as to define a local spacing between the at least one first plate and the at least one second plate, providing at least one first supporting member, having a first axis of symmetry, the at least one first supporting member being arranged to apply a locking force to the at least one first plate, and to engage the at least one second supporting member, providing at least one locking part connected to the at least one first supporting member, positioning the at least one second supporting member and the at least one first supporting member coaxially regarding the first axis and the second axis, and engaging the at least one first supporting member with the at least one second supporting member such that the at least one second supporting member actuates the at least one first plate by application of a positioning force controlled to orient the at least one first plate such that the at least one anisotropic device is moved to face the desired space angle, and engaging at least one locking part such that at least one first supporting member is actuated into a locking position such that a sum of a positioning force acting by the at least one second supporting member and a locking force acting by the at least one first supporting member upon the at least one first plate substantially vanishes, so that a resulting local moment of force oriented to deform the at least one first plate also substantially vanishes.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above may be better understood by referring to the following description, which should be read in conjunction with the accompanying drawings. This description of embodiments, set out below to enable one to build and use an implementation of the invention, is not intended to limit the invention, but to serve as particular examples thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not exceed the scope of the present invention.

Figure 1:
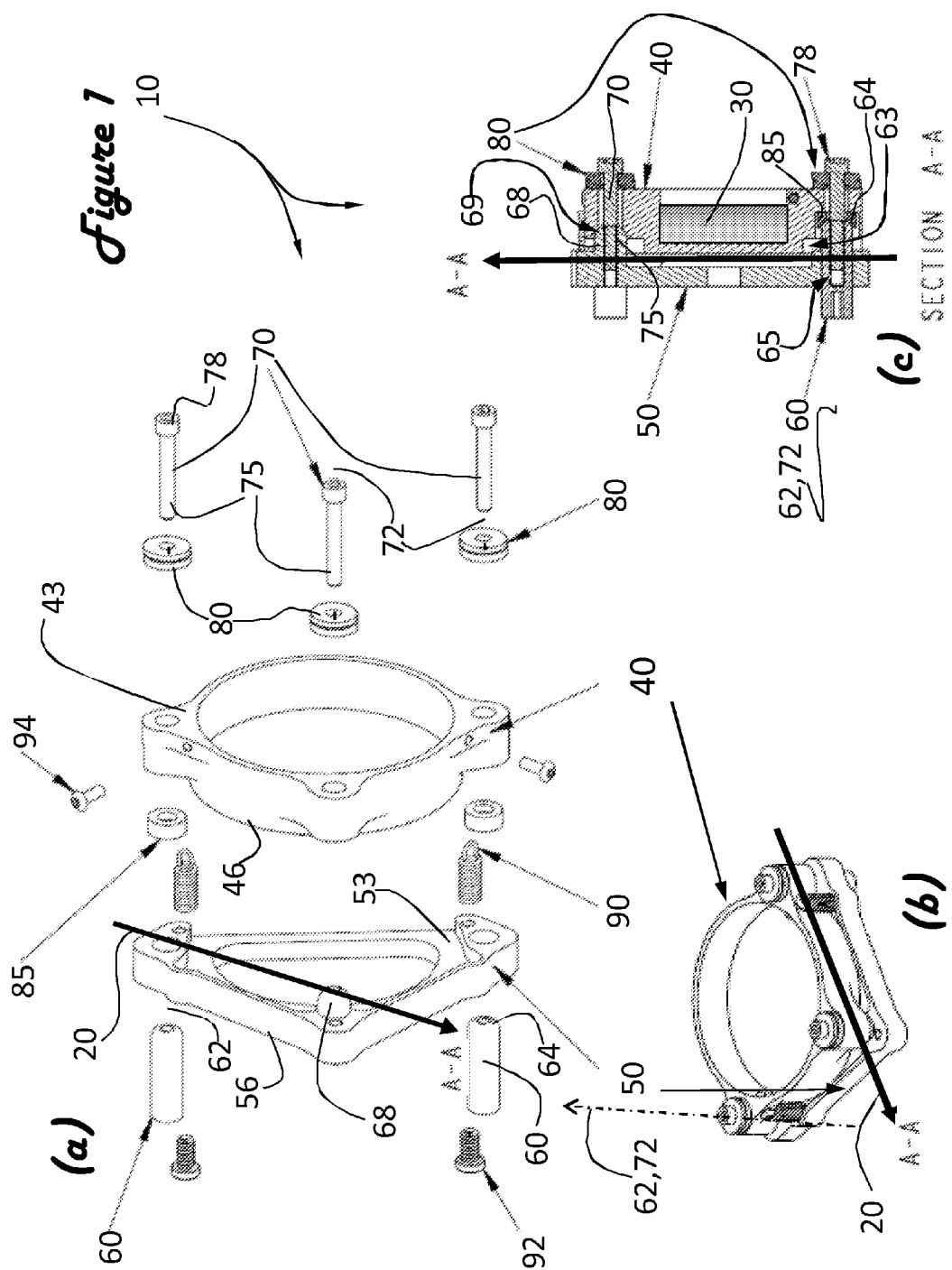
FIG. 1 is an illustration of an exemplary embodiment of the directionally adjustable mount in accordance to the present invention.

FIG. 1 illustrates an exemplary preferred embodiment of a directionally adjustable mount 10 of the current invention as renderings of an exploded prospective view (FIG. 1(a)), a prospective view of an assembly (FIG. 1(b)), and a perpendicular cross-section in a plane containing the "A-A" orientation axis 20 (FIG. 1(c)). It may be noted that the embodiment in FIG. 1, although fully functional in the context of current invention, may omit several application-specific parts related to particular supporting of the mount 10, or supporting of the anisotropic device 30 exemplified by a front-surface-reflective ("front-metalized") mirror in the FIG. 1(c).

Examples of one embodiment of a first plate 40 (having a first surface 43 and a second surface 46 of the first plate 40) and a second plate 50 (having a first surface 53 and a second surface 56 of the second plate 50) are illustrated in FIG. 1 as approximately plan—parallel parts for relative ease of manufacturing, for example starting from plan-parallel tooling plate blanks. It should be noted that in different embodiments one or more first plates 40 and the second plates 50 may have different shapes, for example, each enclosed by a single 3D, surface or by a plurality of surfaces properly arranged to permit engagement of the at least one first plate 40 with the at least one second plate 50 and to provide the desired adjustable support for the at least one first plate 40 by the at least one second plate 50.

At least one second supporting member 60, having a second axis of symmetry 62, is also incorporated in the embodiment illustrated in FIG. 1. The at least one second supporting member 60 has been arranged to engage the at least one second plate 50 and rollably support the at least one first plate 40 so as to define a local spacing 63 between the at least one first plate 40 and the at least one second plate 50.

The second supporting member 60 of the exemplary embodiment illustrated in FIG. 1 incorporates at least one curved surface 64 arranged to facilitate the rollable arrangement between the first plate 40 and the second supporting member 60. In particular, as illustrated in FIG. 1, the rollable arrangement between the second plate 40 and the second supporting member 60 allows for at least one pivotal contact 69 between the at least one first plate 40 and at least one pivotal member 68 arranged to provide a pivotal articulation the at least one first plate 40 relative to the at least one second plate 50.

Furthermore, the embodiment illustrated in FIG. 1 includes at least one first supporting member 70, having a first axis of symmetry 72. The at least one first supporting member 70 have been arranged to mechanically support the at least one first plate 40 and to engage the at least one second supporting member 60. Also, the at least one first supporting member 70 incorporates a threaded outer surface 75, and the at least one second supporting member 60 incorporates a threaded cavity 65 such that the at least one first supporting member 70 is arranged to be threadably engaged with the at least one second supporting member 60.

In the embodiment illustrated in FIG. 1, mechanical support of the first plate 40 by the first supporting member is arranged via at least one adjustable member 80 which is arranged to provide a measure of flexibility in relative positioning of parts. In the particular embodiment, the adjustable members 80 are in the form of male and female spherical washers arranged in direct rollable contacts which may utilize some form of lubrication. Nevertheless, it is well established in the art of flexible arrangement of mechanical parts, and therefore may be known to practitioners, that the adjustable members 80 of different embodiments may have several different forms and compositions incorporating natural or synthetic elastomers, including but not limited to, robbers, elastomeric polymers, natural or synthetic foams, natural or synthetic composites incorporating exposed or encapsulated fibers, gases or liquids or combinations. In addition, the adjustable members 80 may also incorporate playable or elastic metal alloys in a form of springs or gaskets, or combinations of the above. Thus, the embodiments incorporating different elastic members having different elastomers or elastic parts do not exceed the scope of the current invention.

Similarly, the exemplary embodiment of the directionally adjustable mount 10 illustrated in FIG. 1 incorporates the at least one rolling surface member 85 embodied in at least one female spherical washer arranged to provide rollable adjustability relative to the curved surface 64 of the second supporting member 60. As discussed above, the rolling surface members 85 of various embodiments may also incorporate parts composed of playable and/or elastic materials.

Furthermore, the embodiment of the directionally adjustable mount illustrated in FIG. 1 incorporates at least one torquing extension 78 of the first supporting member 70 arranged to facilitate application of a torquing action with respect to the first axis of symmetry 72. As it can be deduced from the arrangement illustrated in FIG. 1, the torquing action may be applied by torquing the first supporting member 70 while holding the second supporting member to prevent it's rotation around the pertinent first axis of symmetry 62 or vice versa. It may be noted that simultaneous controlled torquing of both, the first supporting member 70 torquing extension 78 and the corresponding second supporting member 60 may also result in the desired adjustability of the first plated 40 positioned in proximity to the first surface 53 of the at least one second plate 50 such that the second surface 46 of the at least one first plate 40 is positioned to face the at least one second plate 50.

Additionally, it may be observed in FIG. 1 that the illustrated exemplary embodiment, as assembled, exhibits a substantially coaxial arrangement of pairs of axis of symmetry including one firt axis of symmetry 72 and one corresponding second axis of symmetry 62. This coaxial arrangement is defined by the precision of manufacturing of the pertinent parts and represents essentially a self-adjusting feature of the FIG. 1—illustrated embodiment arrangement. In different embodiments, a range of axis misalignment of the first and second axis of symmetry 72, 62 is limited, for example, not only by a choice of dimensions of parts (mostly plates 40 and 50), but also by the elastic properties of constituent parts of the adjustable members 80. It is expected that, depending of the applications, different embodiment of the present inventions may tolerate misalignments between the first and second axis of symmetry 72, 62 of approximately ±45° as the cosine (as one effective measure of co-directionality of the axis) of this angle still exceeds 70%.

Finally, the embodiment in FIG. 1 additionally incorporates standard parts of mounts well known to the practitioners. Those parts include helical springs 90, helical spring mounting bolts 92, and helical springs retaining pins 94, all arranged (in congruity with pertinent features of the first and the second plate 40 and 50) to provide relatively flexible but reproducible integrated arrangement of the directionally adjustable mount 10.

Figure 2:
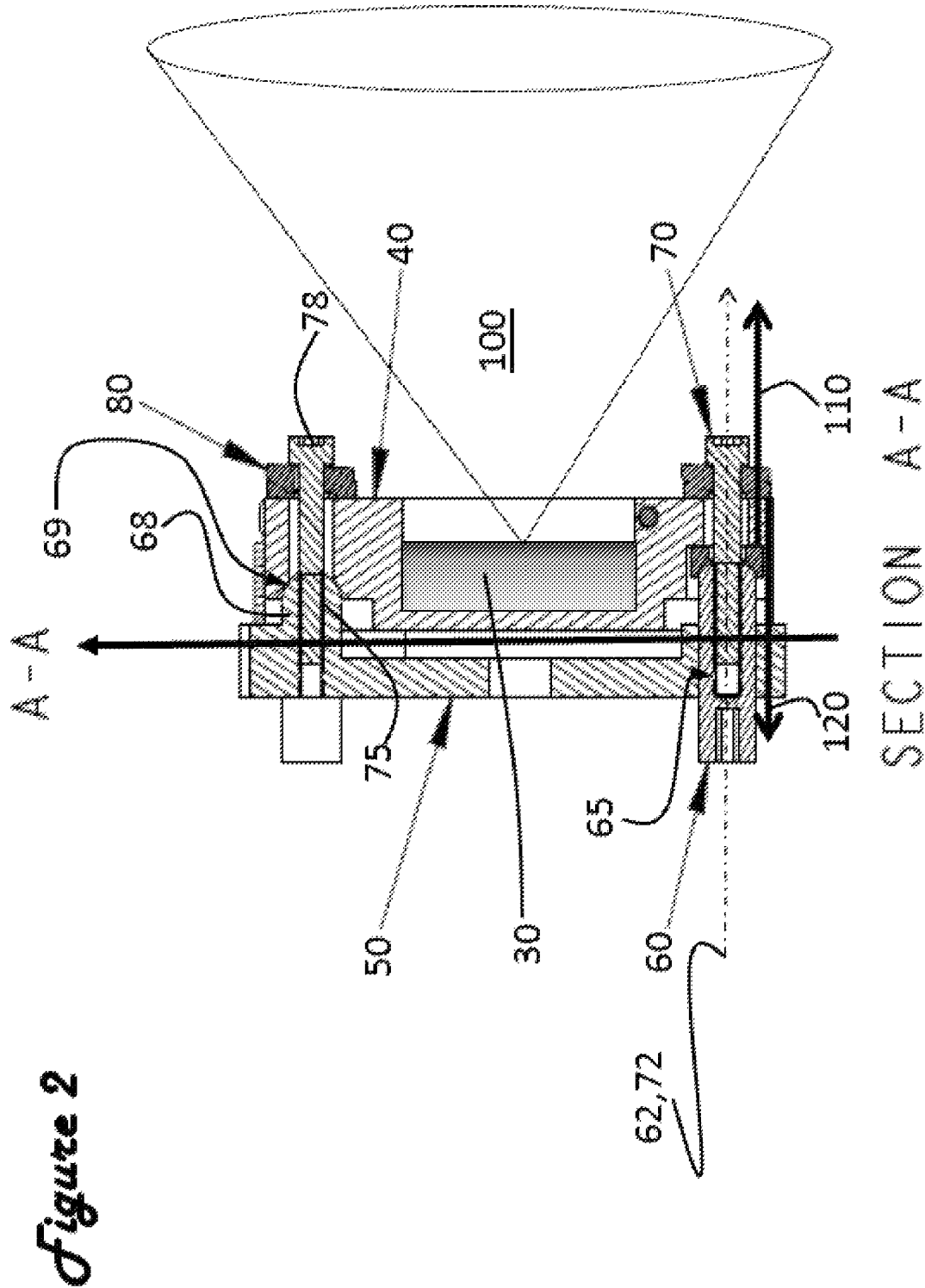
FIG. 2 is a cross-sectional illustration of an exemplary embodiment of the directionally adjustable mount in accordance to the present invention.

One feature of the exemplary embodiment of the present invention as illustrated in FIG. 1 is emphasized for clarity in FIG. 2. Namely, the directionally adjustable mount 10 is arranged so that the at least one second supporting member 60 and the at least one first supporting member 70 have been arranged substantially coaxially regarding the first axis of symmetry 72 and the second axis of symmetry 62, such that, when in a locked position, a sum of a positioning force 110 applied by the at least one second supporting member 60 and a locking force 120 applied by the at least one first supporting member 70 upon the at least one first plate 40 substantially vanishes, so that a resulting local moment of force oriented to deform the at least one first plate also substantially vanishes.

Therefore, the bending moment on the first plate 40 is approximately zero not only integrally (regarding the entire first plate 40) but also locally at % every point of support of the first plate 40. Consequently, when the first plate is adjusted so that the anisotropic device 30 faces the desired space angle 100 by variation of at least one positioning force 110 and locked by application by the corresponding locking forces 120 no residual deforming moments are available to deform or stress the anisotropic device 30. Thus, the anisotropic device 30 preserves the desired orientation toward the space angle 100 substantially unaffected by temperature variations, air circulation, or periodic mechanical vibrations. This feature is of particular importance for mobile or portable applications of the directionally adjustable mount 10.

Figure 3:
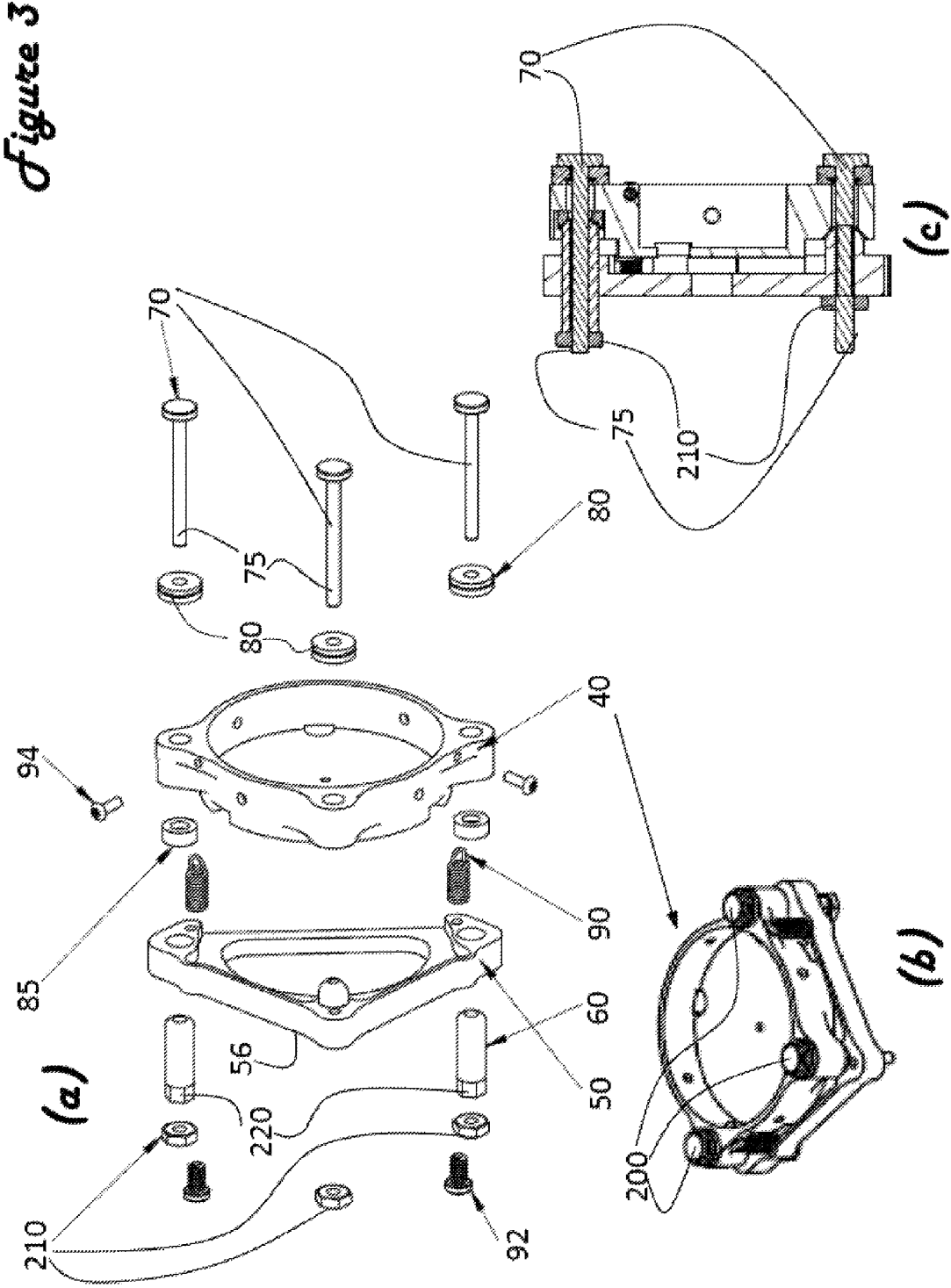
FIG. 3 is an illustration of another exemplary embodiment of the directionally adjustable mount in accordance to the present invention.

A different embodiment of the directionally adjustable mount 10 in accordance with the current invention is illustrated in FIG. 3. In FIG. 3, the parts substantially (or functionally) similar to the corresponding parts illustrated in FIGS. 1 and 2 are indicated using unchanged reference numerals. New and different parts (even when intended to replace corresponding parts of aforementioned embodiments) are indicated with the reference numerals in "200 series" in FIG. 3. This convention for using reference numerals will be preserved, mutatis mutandis, in following disclosures and ensuing Figures.

The exemplary embodiment illustrated in FIG. 3 incorporates first supporting members, having threaded outer surface 75, arranged to frictionally engage the second supporting members 60. At least one additional locking part 210 is arranged to threadably engage at least one threaded outer surface 75 and contact at least one second supporting member 60. At least second supporting members 60 incorporates a profiled surface 220 arranged to facilitate application of a torquing action upon the second supporting member 60 either by a free hand or by application of standard or specialized torquing utensilia.

One use of the exemplary embodiments illustrated in FIG. 3 includes application of at least one positioning force 110 by application of a controlled torquing action upon at least one second supporting member 60. When a desired orientation of the first plate 40 has been achieved, application of an additional torquing action upon at least one additional locking part 210 causes an action of the first supporting member 70 upon at least one elastic member 80 and, in turn at least one locking force 120 upon at least one first plate 40. Again, as discussed above pertaining the FIG. 1—illustrated embodiment, the positioning forces 110 and the corresponding locking forces 120 may be adjusted so that local bending moment effectively vanishes.

One feature of the exemplary embodiment illustrated in FIG. 3 is that positioning and locking of the first plate originate by actions and operations performed upon parts positioned on the common side of the second plate 50 (in particular example in FIG. 3, on the side facing the second surface 56 of the second plate 50). This feature may be of importance for application where one side of the directionally adjustable mount 10 is inaccessible or such an access implies additional inconveniences or performance degradation.

Figure 4:
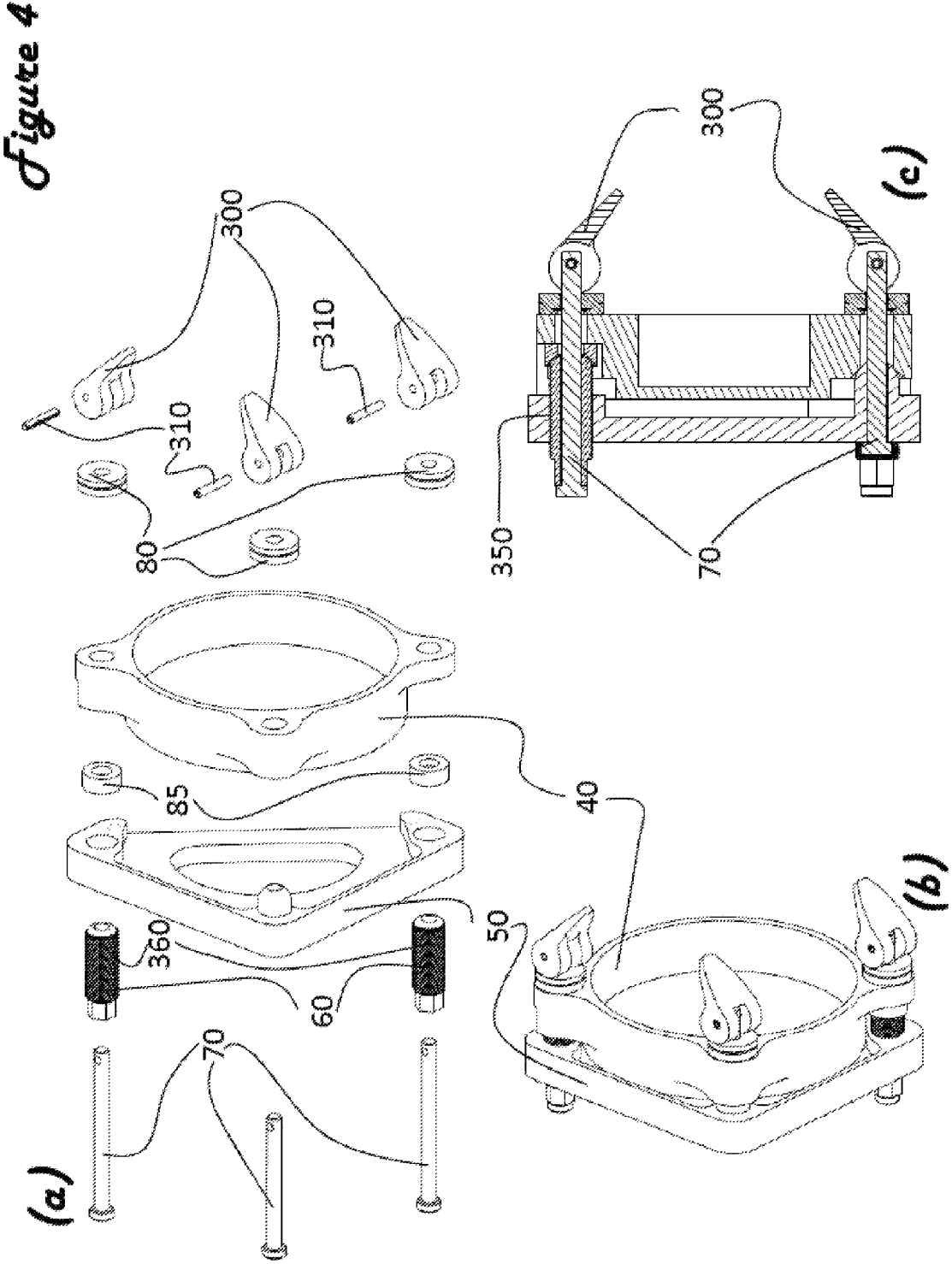
FIG. 4 is an illustration of yet another exemplary embodiment of the directionally adjustable mount in accordance to the present invention.
Figure 5:
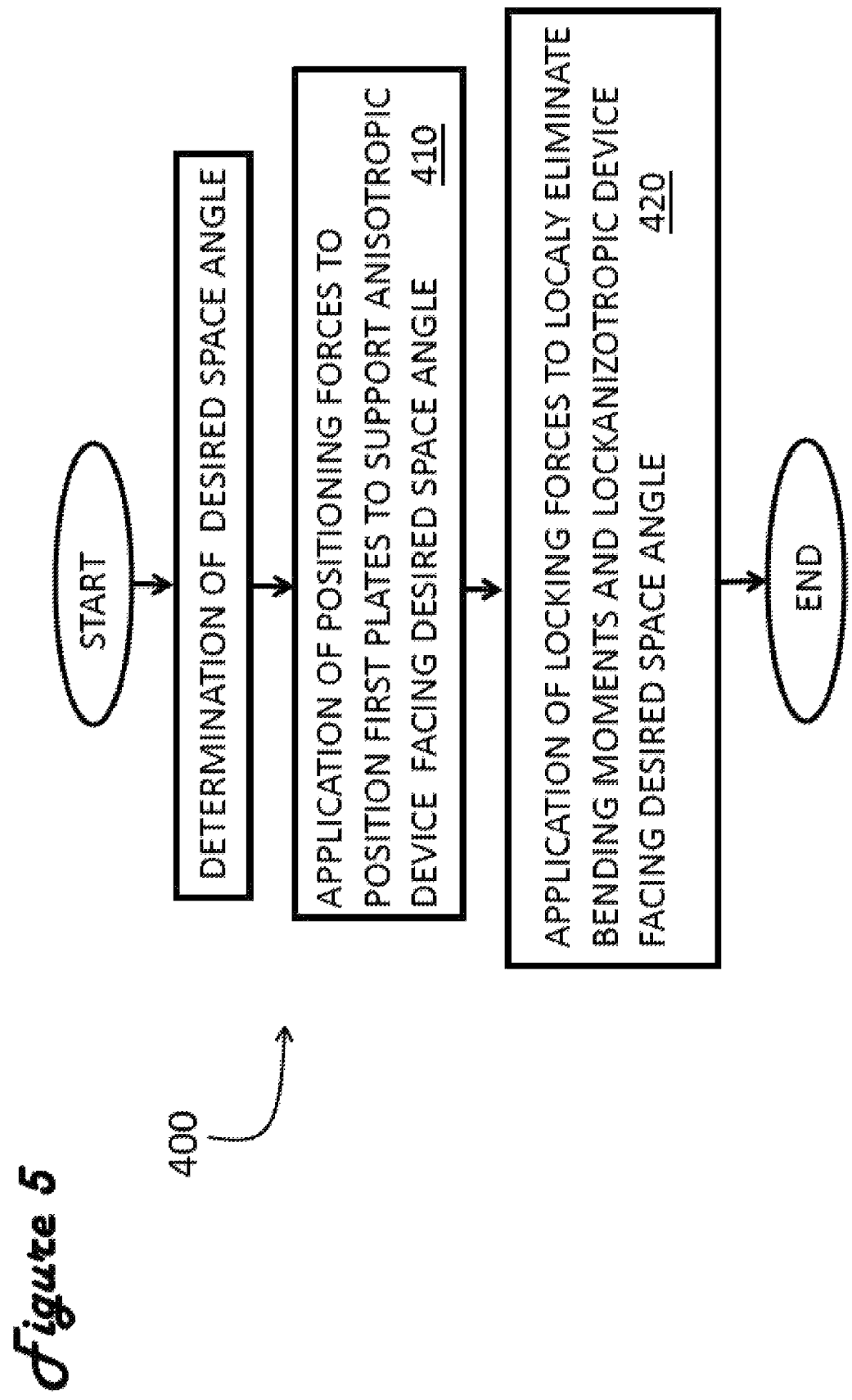
FIG. 5 illustrated a flowchart exemplifying one method of application of the directionally adjustable mount in accordance to the present invention.

FIG. 4 illustrates yet another exemplary embodiment of the directionally adjustable mount 10 of the current invention as renderings of an exploded prospective view (FIG. 4(*a*)), a prospective view of an assembly (FIG. 4(*b*)), and a perpendicular cross-section (FIG. 4(*c*)). One feature of the FIG. 4—illustrated embodiment is a quick release arrangement including at least one quick release locking part 300 arranged to engage at least one first supporting member 70 via at least one coupler 310. The first supporting members 70 of this embodiment do not include threaded outer surfaces 75 but are arranged to frictionally engage the second supporting members 60. In contrast, at least one second supporting member 60 does incorporate a threaded surface 360 arranged to threadably engage the first plate 50 via at least one first plate treaded surface 350.

One of preferred methods of application of the embodiments of the directionally adjustable mount 10 in accordance with the current invention is illustrated in the flow-chart 400 in FIG. 4. Step 410 of the flow-chart 500 includes providing at least one second supporting member 60, having a second axis of symmetry 62, the at least one second supporting member 60 being arranged to engage the at least one second plate 50 and pivotally contact the at last one first plate 40 so as to define a local spacing 63 between the at least one first plate 40 and the at least one second plate 50. Also, providing at least one first supporting member 70, having a first axis of symmetry 72, the at least one first supporting member 70 being arranged to contact and to apply the locking force 120 to the at least one first plate 40, and engage the at least one second supporting member 60.

In addition, step 410 further includes positioning the at least one second supporting member 60 and the at least one first supporting member 70 coaxially regarding the first axis 72 and the second axis 62, and engaging the at least one first supporting member 60 with the at least one second supporting member 70 such that the at least one second supporting member 60 actuates the at least one first plate 40 by application of the positioning force 110 controlled to orient the at least one first plate 40 such that the at least one anisotropic device 30 is moved to face the desired space angle 100.

Similarly, step 420 includes positioning the at least one first supporting member 70 to achieve a locking position such that a sum of the positioning force 110 actuated by the at least one second supporting member 60 and the locking force 120 actuated by the at least one first supporting member 70 upon the at least one first plate 40 substantially vanishes, so that a resulting local moment of force oriented to deform the at least one first plate also substantially vanishes.

In a different method of application of the embodiments of the directionally adjustable mount 10 in accordance with the current invention the step 410 further includes providing at least one locking part 300 connected to the at least one first supporting member 70, while the step 420 incorporates positioning the at least one second supporting member 60 and the at least one first supporting member 70 coaxially regarding the first axis 72 and the second axis 62, and engaging the at least one first supporting member 70 with the at least one second supporting member 60 such that the at least one second supporting member 70 actuates the at least one first plate 40 by application of a positioning force 110 controlled to orient the at least one first plate 40 such that the at least one anisotropic device 30 is moved to face the desired space angle, engaging at least one locking part 300 such that at least one first supporting member 70 is actuated into a locking position such that a sum of a positioning force 110 acting by the at least one second supporting member 60 and a locking force 120 acting by the at least one first supporting member 70 upon the at least one first plate 40 substantially vanishes, so that a resulting local moment of force oriented to deform the at least one first plate also substantially vanishes.

The invention has been described with references to preferred embodiments. While specific features, relationships, materials and steps have been set forth for purpose of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. A directionally adjustable mount comprising:
   at least one first plate being arranged to orient and stabilize at least one anisotropic device such that the at least one anisotropic device is oriented to face a desired space angle,
   at least one second plate being arranged to engage the at least one first plate and provide a support for the: at least one first plate,
   at least one second supporting member, having a second axis of symmetry, the at least one second supporting member has been arranged to engage the at least one second plate and to rollably support the at least one first plate so as to define a local spacing between the at least one first plate and the at least one second plate,
   at least one first supporting member, having a first axis of symmetry, the at least one first supporting member have been arranged to mechanically support the at least one first plate and engage the at least one second supporting member
   wherein, when at least one anisotropic device had been oriented in a desired orientation to face the desired space angle and locked in a locked position such that the desired orientation does not drift in time, the at least one second supporting member and the at least one first supporting member have been arranged substantially coaxially regarding the first axis of symmetry and the second axis of symmetry, such that in the locked position, a sum of a positioning force applied by the at least one first supporting member and a locking force applied by the at least one second supporting member upon the at least one first plate substantially vanishes, so that a resulting local moment of force oriented to deform the at least one first plate also substantially vanishes.

2. The directionally adjustable mount of claim 1, comprising at least one adjustable member arranged to provide rollable adjustability to the at least one first plate relative to the at least one first supporting member.

3. The directionally adjustable mount of claim 1, comprising at least one rolling surface member arranged to provide a rollable arrangement between the at least one first plate and the at least one second supporting member.

4. The directionally adjustable mount of claim 1, wherein the at least one first plate and the at least one second plate incorporate at least one pivotal contact arranged to provide pivotal articulation of the at least one first plate relative to the at least one second plate.

5. The directionally adjustable mount of claim 2, wherein the at least one adjustable member incorporates an elastic material.

6. The directionally adjustable mount of claim 3, wherein the at least one rolling surface member is a female spherical washer.

7. The directionally adjustable mount of claim 1, wherein the at least one first supporting member incorporates a threaded outer surface and the at least one second supporting member incorporates a threaded cavity such that the at least one first supporting member is arranged to be threadably engaged with the at least one second supporting member.

8. The directionally adjustable mount of claim 7, wherein the at least one first supporting member incorporates at least one torquing extension arranged to facilitate application of a torquing action with respect to the first axis of symmetry.

9. The directionally adjustable mount of claim 8, wherein the at least one torquing extension arranged in proximity to a first surface of the at least one first plate while a second surface of the at least one first plate is positioned to face the at least one second plate.

10. The directionally adjustable mount of claim 8, wherein the at least one torquing extension arranged in proximity to a first surface of the at least one first plate while a second surface of the at least one first plate is positioned to face the at least one second plate.

11. The directionally adjustable mount of claim 7, wherein the at least one first supporting member is attached to a locking part such that, when actuated, the locking part substantially locks a threaded outer surface of the at least one second supporting member to a threaded cavity of the at least one second plate.

12. A method for locking a directionally adjustable mount comprising:
providing at least one first plate being arranged to orient and stabilize at least one anisotropic device such that the at least one anisotropic device is oriented to face a desired space angle,
providing at least one second plate being arranged to engage the at least one first plate and provide a support for the at least one first plate,
providing at least one second supporting member, having a second axis of symmetry, the at least one second supporting member being arranged to engage the at least one second plate and rollably support the at last one first plate so as to: define a local spacing between the at least one first plate and the at least one second plate,
providing at least one first supporting member, having a first axis of symmetry, the at least one first supporting member being arranged to apply a locking force to the at least one first plate, and to engage the at least one second supporting member;
positioning the at least one second supporting member and the at least one first supporting member coaxially regarding the first axis and the second axis, and engaging the at least one first supporting member with the at least one second supporting member such that the at least one second supporting member actuates the at least one first plate by application of the positioning force controlled to orient the at least one first plate such that the at least one anisotropic device is moved to face the desired space angle,
positioning the at least one first supporting member in a locked position having at least one anisotropic device oriented in a desired orientation to face the desired space angle and locked in the locked position such that the desired orientation does not drift in time, a sum of the positioning force actuated by the at least one second supporting member and the locking force actuated by the at least one first supporting member upon the at least one first plate substantially vanishes, so that a resulting local moment of force oriented to deform the at least one first plate also substantially vanishes.

13. The method for locking the directionally adjustable mount of claim 12, comprising providing at least one adjustable member to provide rollable adjustability to the at least one first plate relative to the at least one first supporting member.

14. The method for locking the directionally adjustable mount of claim 12, comprising providing at least one rolling surface member been arranged to establish a rollable arrangement between the at least one first plate and the at least one second supporting member.

15. The method for locking the directionally adjustable mount of claim 12, wherein the at least one first plate and the at least one second plate incorporate at least one pivotal contact arranged to provide pivotal articulation of the at least one first plate relative to the at least one second plate.

16. The method for locking the directionally adjustable mount of claim 13, wherein the at least one adjustable member incorporates an elastic material.

17. The method for locking the directionally adjustable mount of claim 16, wherein at least one rolling surface member is a female spherical washer.

18. The method for locking the directionally adjustable mount of claim 12, wherein the at least one first supporting member provides at least one torquing extension arranged to facilitate application of a torquing action with respect to the first axis of symmetry.

19. The method for locking the directionally adjustable mount of claim 18, wherein the at least one torqueing extension is arranging in proximity to a first surface of the at least one first plate while a second surface of the at least one plate is positioned to face the at least one second plate.

20. The method for locking the directionally adjustable mount of claim 18, wherein the at least one torquing extension arranged in proximity to a first surface of the at least one first plate while a second surface of the at least one first plate is positioned to face the at least one second plate.

21. A method for locking a directionally adjustable mount comprising:
providing at least: one first plate being arranged to orient and stabilize at least one anisotropic device such that the at least one anisotropic device is oriented to face a desired space angle, providing at least one second plate being arranged to engage the at least one first plate and provide a support for the at least one first plate providing at least one second supporting member, having a second axis of symmetry, the at least one second supporting member being arranged to engage the at least one second plate and rollably support the at last one first plate so as to define a local spacing between the at least one first plate and the at least one second plate, providing at least one first supporting member, having a first axis of symmetry, the at least: one first supporting member being arranged to apply a locking force to the at least one first plate, and to engage the at least one second supporting member, providing at least one locking part connected to the at least one first supporting member;

positioning the at least one second supporting member and the at least one first supporting member coaxially regarding the first axis and the second axis, and engaging the at least one first supporting member with the at least one second supporting member such that the at least one second supporting member actuates the at least one first plate by application of a positioning force controlled to orient the at least one first plate such that the at least one anisotropic device is moved to face the desired space angle, engaging at least one locking part such that at least one first supporting member is actuated into a locking position having at least one anisotropic device oriented in a desired orientation to face the desired space angle and locked in the locked position such that the desired orientation does not drift in time, such that a sum of a positioning force acting by the at least one second supporting member and a locking force acting by the at least one second supporting member upon the at least one first plate substantially vanishes, so that a resulting local moment of force oriented to deform the at least one first plate also substantially vanishes.

* * * * *